US009131383B2

(12) United States Patent
Okamura et al.

(10) Patent No.: US 9,131,383 B2
(45) Date of Patent: *Sep. 8, 2015

(54) COMMUNICATION APPARATUS, AND METHOD AND PROGRAM FOR CONTROLLING THE SAME

(71) Applicant: NEC Magnus Communications, Ltd., Tokyo (JP)

(72) Inventors: Yuusaku Okamura, Tokyo (JP); Yasushi Hamada, Tokyo (JP); Kazutoshi Ohishi, Tokyo (JP)

(73) Assignee: NEC MAGNUS COMMUNICATIONS, LTD., Tokyo (JP)

( * ) Notice: Subject to any disclaimer, the term of this patent is extended or adjusted under 35 U.S.C. 154(b) by 182 days.

This patent is subject to a terminal disclaimer.

(21) Appl. No.: 13/932,302

(22) Filed: Jul. 1, 2013

(65) Prior Publication Data
US 2014/0011457 A1   Jan. 9, 2014

(30) Foreign Application Priority Data
Jul. 3, 2012   (JP) ................... 2012-149449

(51) Int. Cl.
H04B 1/00 (2006.01)
H04B 15/00 (2006.01)
H04W 16/14 (2009.01)

(52) U.S. Cl.
CPC .................... H04W 16/14 (2013.01)

(58) Field of Classification Search
CPC ..................................... H04W 16/14
USPC ............................ 455/63.3, 63.1
See application file for complete search history.

(56) References Cited

U.S. PATENT DOCUMENTS 8,914,838 B2 * 12/2014 Okamura et al. ............. 725/125

FOREIGN PATENT DOCUMENTS

JP    2010-135972    6/2010

* cited by examiner

Primary Examiner — Eugene Yun
(74) Attorney, Agent, or Firm — Young & Thompson

(57) ABSTRACT

A communication apparatus comprises a reception unit that receives a reception signal from a metal cable and extracts reception data; a transmission unit that sends a transmission signal obtained by modulating transmission data with a frequency included in a first frequency band to the metal cable; an interference signal detection unit that detects a signal used in wireless communication, modulated by a frequency included in a second frequency band, and transmitted over the metal cable as an interference signal; and a signal transmission control unit that instructs the transmission unit to modulate transmission data using a frequency included in a third frequency band that does not have any frequency band overlapping the second frequency band when the interference signal is detected and a frequency band overlapping both the first frequency band and the second frequency band exists.

18 Claims, 8 Drawing Sheets

COMMUNICATION APPARATUS, AND METHOD AND PROGRAM FOR CONTROLLING THE SAME

REFERENCE TO RELATED APPLICATION

The present invention is based upon and claims the benefit of the priority of Japanese patent application No. 2012-149449 filed on Jul. 3, 2012, the disclosure of which is incorporated herein in its entirety by reference thereto.

The present invention relates to a communication apparatus, and method and program for controlling the same, and particularly to a communication apparatus using a metal cable, and a method and program for controlling the same.

TECHNICAL FIELD

Background

In recent years, the number of opportunities to configure a LAN (Local Area Network) in a single home has increased. In many cases, a LAN via Ethernet (registered trademark) cables is initially considered, however, it may be difficult to install new cables in a building constructed without keeping such an installation of cables in mind. This is because doors and stairs in the house become obstacles for the installation of new cables.

Meanwhile, wireless LAN is quite popular, however, wireless communication is susceptible to the surrounding environment and may not be able to achieve a sufficient communication speed, compared to wired communication. The surrounding environment includes radio waves leaking from neighboring buildings. Under such circumstances, a LAN is often configured utilizing metal cables such as the telephone line already installed in the house or the coaxial cable used for receiving television broadcasts.

Patent Literature 1 discloses a communication apparatus that uses a coaxial cable as a transmission path of a signal. The communication apparatus disclosed by Patent Literature 1 suppresses the leakage of unnecessary radio waves from antennas by determining whether or not a coaxial cable used includes a broadcast signal and changing the signal level used in the communication when the coaxial cable includes a broadcast signal.

[Patent Literature 1]
Japanese Patent Kokai Publication No. JP-P2010-135972A

SUMMARY

Further, the disclosure of the prior art document is incorporated herein in its entirety by reference thereto. The following analysis is given by the present inventors.

As described above, when a LAN is configured in a home, metal cables such as coaxial cables are sometimes used. Meanwhile, wireless communication devices such as mobile telephones and smartphones have become widely popular in recent years. Therefore, a communication apparatus using metal cables and a wireless communication device such as a mobile telephone are often used simultaneously in the same house. As a result, a signal going through the metal cable may negatively affect the communication quality of the wireless communication device by interfering with radio waves used by the wireless communication device.

In other words, when the frequency bands used by the wireless communication device and the communication apparatus using metal cables overlap, radio waves leak from terminals connecting the metal cables or cables, and the leaked radio waves affect the communication performed by the wireless communication device. Or when the metal cables are connected to an antenna installed on the building, a signal may be transmitted outdoors via the antenna, affecting the wireless communication device and the base station thereof.

FIG. 8 is a drawing for explaining the effects the communication apparatus has on the wireless communication device. In FIG. 8, communication apparatuses 201 and 202 communicate with each other via a distributor 203. A signal used in the communication leaks from a coaxial cable (or coaxial terminal) and may affect the communication performed by a mobile telephone 204. Further, radio waves are emitted from a UHF (Ultra-High Frequency) antenna 205 and may affect a base station 206.

Therefore, a communication apparatus that uses a metal cable and that prevents the deterioration of the quality of the communication performed by a wireless communication device by not using the frequency band used by the wireless communication device when the wireless communication device including the base station thereof exists in the vicinity is desired. Note that a signal detected in Patent Literature 1 is a broadcast signal of, for instance, satellite broadcasting. Meanwhile, signals transmitted by a wireless communication device are not always present in a coaxial cable. Therefore, signals transmitted by a wireless communication device cannot be treated as broadcast signals and the technology disclosed in Patent Literature 1 is not able to prevent the deterioration of the quality of the communication performed by a wireless communication device.

According to a first aspect of the present invention, there is provided a communication apparatus comprising a reception unit that receives a reception signal from a metal cable and extracts reception data; a transmission unit that sends a transmission signal obtained by modulating transmission data with a frequency included in a first frequency band to the metal cable; an interference signal detection unit that detects a signal used in wireless communication, modulated by a frequency included in a second frequency band, and transmitted over the metal cable as an interference signal; and a signal transmission control unit that instructs the transmission unit to modulate transmission data using a frequency included in a third frequency band that does not have any frequency band overlapping the second frequency band when the interference signal is detected and a frequency band overlapping both the first frequency band and the second frequency band exists.

According to a second aspect of the present invention, there is provided a method for controlling a communication apparatus comprising using a communication apparatus which comprises a reception unit that receives a reception signal from a metal cable and extracts reception data, and a transmission unit that sends a transmission signal obtained by modulating transmission data with a frequency included in a first frequency band to the metal cable; and the method further comprises detecting a signal used in wireless communication, modulated by a frequency included in a second frequency band, and transmitted over the metal cable as an interference signal, and instructing the transmission unit to modulate transmission data using a frequency included in a third frequency band that does not have any frequency band overlapping the second frequency band when the interference signal is detected and a frequency band overlapping both the first frequency band and the second frequency band exists. Further, the present method is tied to a particular machine, which is the communication apparatus comprising a reception unit that receives a reception signal from a metal cable and extracts reception data, and a transmission unit that sends a transmission signal obtained by modulating transmission data with a frequency included in a first frequency band to the metal cable.

According to a third aspect of the present invention, there is provided a program executed by a computer that controls a communication apparatus, wherein said program executes by using a communication apparatus which comprises a reception unit that receives a reception signal from a metal cable and extracts reception data, and a transmission unit that sends a transmission signal obtained by modulating transmission data with a frequency included in a first frequency band to the metal cable; and the program executes detecting a signal used in wireless communication, modulated by a frequency included in a second frequency band, and transmitted over the metal cable as an interference signal, and instructing the transmission unit to modulate transmission data using a frequency included in a third frequency band that does not have any frequency band overlapping the second frequency band when the interference signal is detected and a frequency band overlapping both the first frequency band and the second frequency band exists. Further, this program may be stored in a computer-readable storage medium. The storage medium may be a non-transient one such as a semiconductor memory, hard disk, magnetic storage medium, or optical storage medium. The present invention can also be realized as a computer program product.

The meritorious effects of the present invention include as the following, without limitation hereto. According to each aspect of the present invention, there is provided a communication apparatus that uses a metal cable and that prevents the deterioration of the quality of the communication performed by a wireless communication device by not using the frequency band used by the wireless communication device when the wireless communication device including the base station thereof exists in the vicinity, and a method and program for controlling the same.

PREFERRED MODES

First, a summary of an exemplary embodiment will be given using FIG. 1. Note that drawing reference signs used in the summary are given to elements as an example for convenience to facilitate understanding, and the description of the summary is not intended to limit the scope of the present invention in any way.

As stated above, a communication apparatus that uses a metal cable such as a coaxial cable and that prevents the deterioration of the quality of the communication performed by a wireless communication device by not using the frequency band used by the wireless communication device when the wireless communication device including the base station thereof exists in the vicinity is desired.

Figure 1:
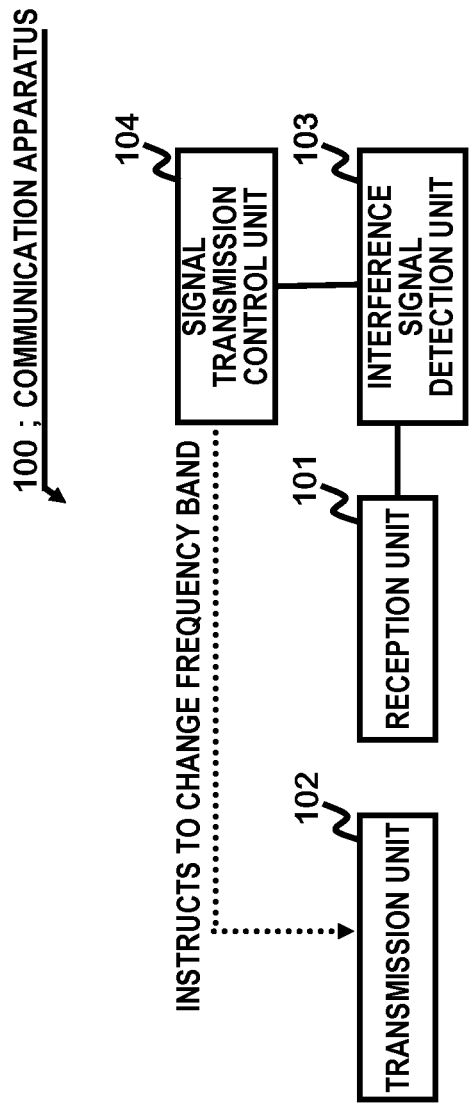
FIG. 1 is a drawing for explaining a summary of an exemplary embodiment.

As an example, provided is a communication apparatus 100 shown in FIG. 1. The communication apparatus 100 comprises a reception unit 101, a transmission unit 102, an interference signal detection unit 103, and a signal transmission control unit 104. The reception unit 101 receives a reception signal from a metal cable and extracts reception data. The transmission unit 102 sends a transmission signal obtained by modulating transmission data with a frequency included in a first frequency band to the metal cable. The interference signal detection unit 103 detects a signal used in wireless communication, modulated by a frequency included in a second frequency band, and transmitted over the metal cable as an interference signal. The signal transmission control unit 104 instructs the transmission unit 102 to modulate the transmission data using a frequency included in a third frequency band that does not have any frequency band overlapping the second frequency band when an interference signal is detected and a frequency band overlapping both the first frequency band and the second frequency band overlap exists.

The communication apparatus 100 detects a signal used by a wireless communication device such as a mobile telephone as an interference signal over a metal cable, and when an interference signal is present, the communication apparatus 100 communicates with other communication apparatuses while avoiding a frequency band used by the interference signal. As a result, even when mobile telephones and base stations are present in the vicinity of the communication apparatus 100, it does not negatively affect these apparatuses and facilities. In other words, a communication apparatus that uses a metal cable such as a coaxial cable and that prevents the deterioration of the quality of the communication performed by a wireless communication device by not using the frequency band used by the wireless communication device when the wireless communication device including the base station thereof exists in the vicinity can be provided. Note that the interference signal is a signal modulated by a predetermined frequency band when a wireless communication device such as a mobile telephone realizes wireless communication and detected on a metal cable.

Further, the following modes are possible.

[Mode 1]

The communication apparatus relating to the first aspect.

[Mode 2]

It is preferred that there be provided an interference signal notification unit that notifies a user of the presence of the interference signal in the metal cable when the interference signal is detected.

[Mode 3]

It is preferred that the signal transmission control unit instruct transmission data to be modulated using a frequency included in a fifth frequency band that does not have any frequency band overlapping a fourth frequency band paired with the second frequency band used for realizing the wireless communication when the interference signal is detected.

[Mode 4]

It is preferred that the interference signal notification unit issue a notification that prompts a user to install a filter in the metal cable.

[Mode 5]

It is preferred that there be provided a control unit that instructs the transmission unit to suspend the transmission of the transmission signal, the interference signal detection unit detect the interference signal while the transmission of the transmission signal is suspended, and that the control unit have the transmission unit restart the transmission of the transmission signal when the interference signal is not detected during the suspension of the transmission of the transmission signal.

[Mode 6]

The communication apparatus control method relating to the second aspect.

[Mode 7]

It is preferred to include notifying a user of the presence of the interference signal in the metal cable when the interference signal is detected.

[Mode 8]

It is preferred to instruct transmission data to be modulated using a frequency included in a fifth frequency band that does not have any frequency band overlapping a fourth frequency band paired with the second frequency band used for realizing the wireless communication when the interference signal is detected.

[Mode 9]

It is preferred, when notifying a user of the presence of said interference signal, to issue a notification that prompts a user to install a filter in the metal cable.

[Mode 10]

It is preferred to include instructing the transmission unit to suspend the transmission of the transmission signal and having the transmission unit restart the transmission of the transmission signal when the interference signal is not detected during the suspension of the transmission of the transmission signal.

[Mode 11]

The program relating to the third aspect.

[Mode 12]

It is preferred to execute notifying a user of the presence of the interference signal in the metal cable when the interference signal is detected.

[Mode 13]

It is preferred to instruct transmission data to be modulated using a frequency included in a fifth frequency band that does not have any frequency band overlapping a fourth frequency band paired with the second frequency band used for realizing the wireless communication when the interference signal is detected.

[Mode 14]

It is preferred, when notifying a user of the presence of said interference signal, to issue a notification that prompts a user to install a filter in the metal cable.

[Mode 15]

It is preferred to execute instructing the transmission unit to suspend the transmission of the transmission signal and having the transmission unit restart the transmission of the transmission signal when the interference signal is not detected during the suspension of the transmission of the transmission signal.

Concrete exemplary embodiments will be described further in detail with reference to the drawings.

Exemplary Embodiment 1

A first exemplary embodiment will be described in detail using the drawing.

Figure 2:
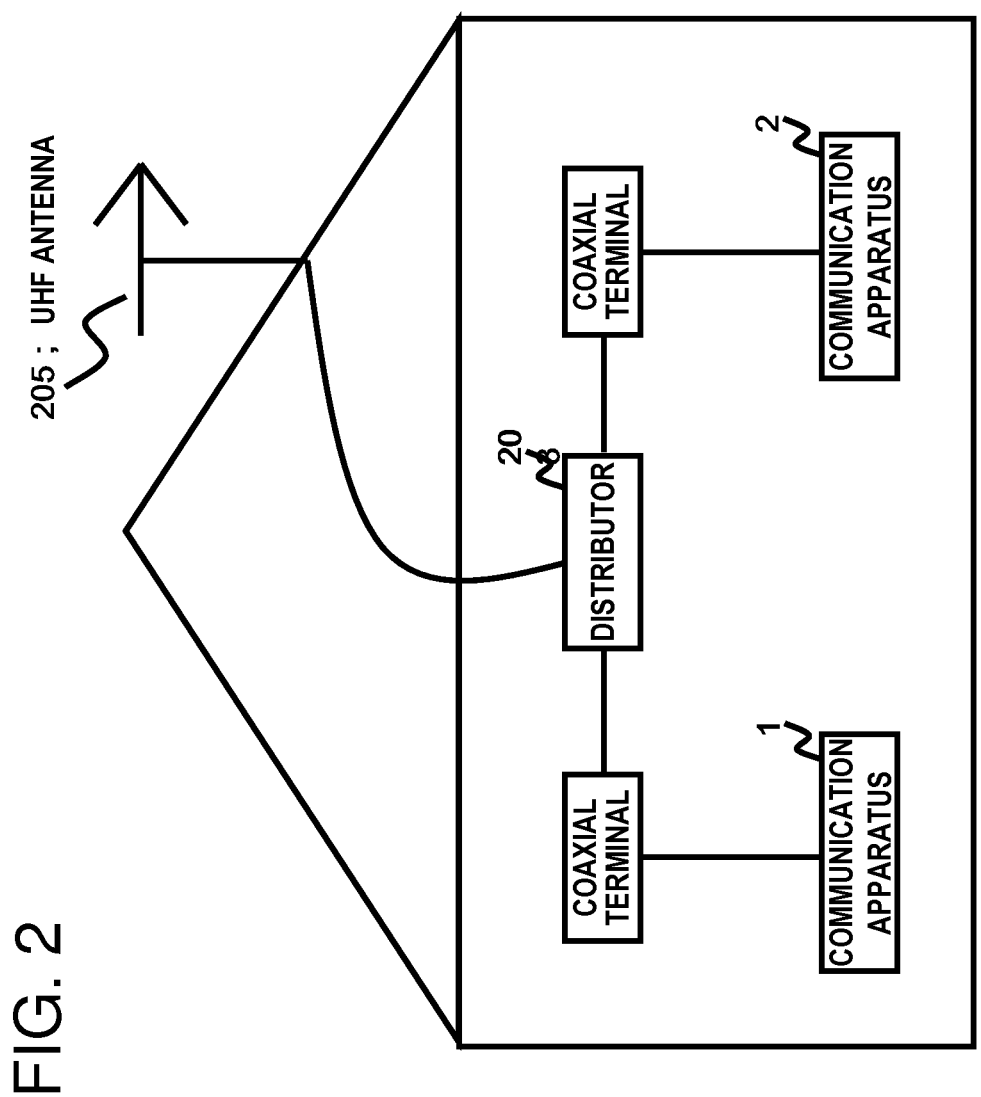
FIG. 2 is a drawing illustrating an example of a network system including a communication apparatus 1 relating to a first exemplary embodiment.

FIG. 2 is a drawing illustrating an example of a network system that includes a communication apparatus 1 relating to the present exemplary embodiment.

FIG. 2 includes two communication apparatuses (1 and 2) and these communication apparatuses 1 and 2 constitute a LAN. The communication apparatuses 1 and 2 are connected to each other via coaxial terminals and coaxial cables (metal cables). The communication apparatuses 1 and 2 are multi-carrier communication apparatuses capable of transmitting/receiving data by switching between a plurality of frequencies. Further, the communication apparatus 2 is configured and operates identically to the communication apparatus 1. Therefore, only the communication apparatus 1 will be described below.

Figure 3:
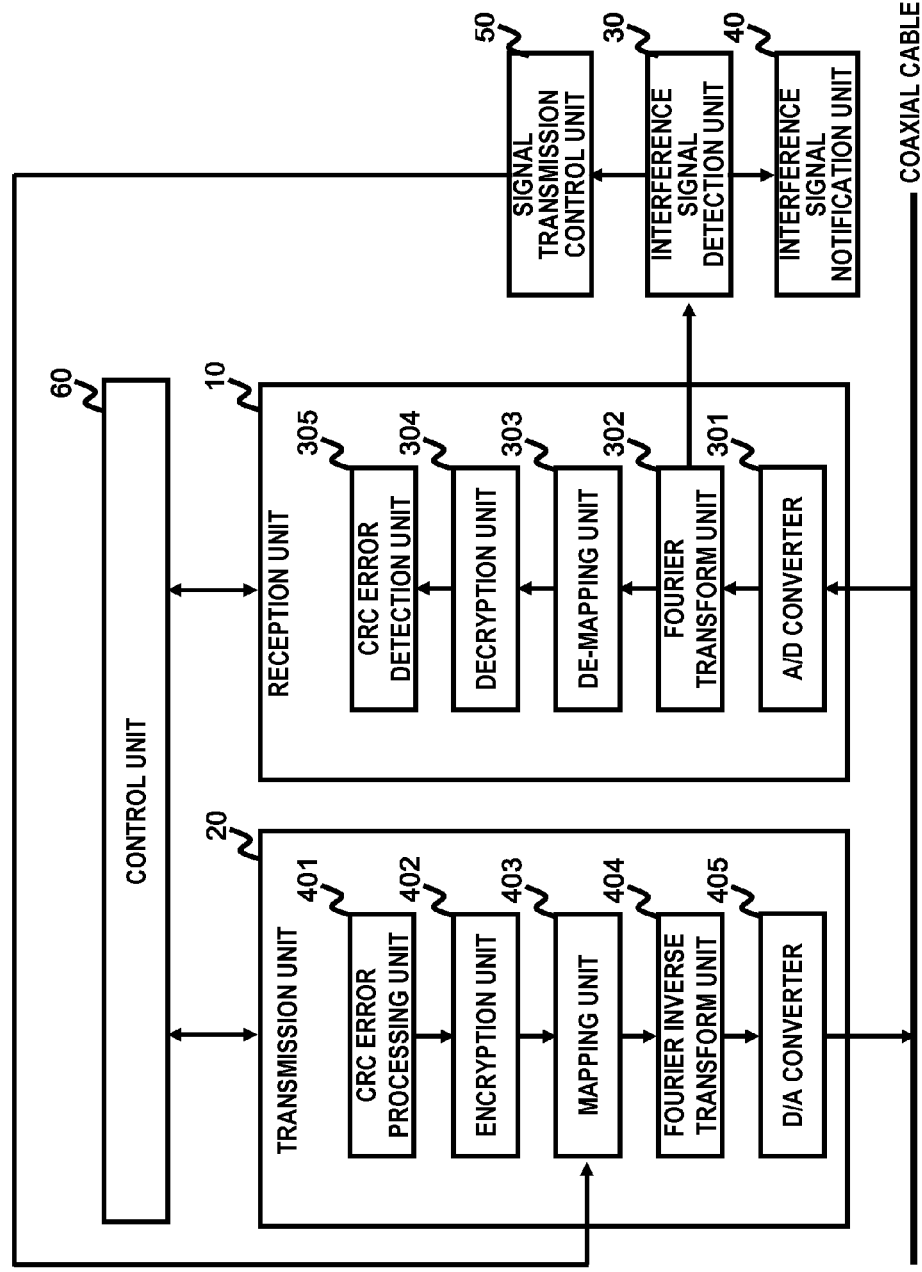
FIG. 3 is a drawing illustrating an example of the internal configuration of the communication apparatus 1.

FIG. 3 is a drawing illustrating an example of the internal configuration of the communication apparatus 1. Note that FIG. 3 only shows modules relating to the communication apparatus 1 relating to the present exemplary embodiment for the sake of simplicity.

The communication apparatus 1 includes a reception unit 10, a transmission unit 20, an interference signal detection unit 30, an interference signal notification unit 40, a signal transmission control unit 50, and a control unit 60.

The communication apparatus 1 realizes communication via the coaxial cable by using the reception unit 10 and the transmission unit 20.

The interference signal detection unit 30 receives a signal separated for each frequency from the reception unit 10. The interference signal detection unit 30 detects whether or not the frequencies of the received frequency sequence include a signal (i.e., interference signal) with which the communication performed by the communication apparatus 1 affects other communications. The interference signal detection unit 30 outputs the detection results to the interference signal notification unit 40 and the signal transmission control unit 50.

When the interference signal detection unit 30 detects an interference signal, the interference signal notification unit 40 notifies the user of the communication apparatus 1 of this fact. The interference signal notification unit 40 may notify the user with light using a light-emitting diode or with a sound such as a warning sound or alarm.

The signal transmission control unit 50 instructs the transmission unit 20 to change the frequency used for modulation.

The control unit 60 controls the entire communication apparatus 1. Further, the control unit 60 receives data from the reception unit 10 and performs information processing based on the reception data. Further, the control unit 60 generates the results of the information processing as transmission data and transmits the data to other communication apparatuses via the transmission unit 20. Note that the interference signal detection unit 30, the interference signal notification unit 40, the signal transmission control unit 50, and the control unit 60 can be realized by a computer program that has a computer built into the communication apparatus 1 execute each processing described later using the hardware thereof.

The reception unit 10 receives a signal transmitted by another communication apparatus (for instance, the communication apparatus 2) from the coaxial cable and extracts it as reception data. The reception unit 10 includes an A/D (Analog to Digital) conversion unit 301, a Fourier transform unit 302, a de-mapping unit 303, a decryption unit 304, and a CRC (Cyclic Redundancy Checking) error detection unit 305.

The A/D conversion unit 301 acquires an analog signal in the coaxial cable and converts it into a digital signal.

The Fourier transform unit 302 performs a Fourier transform on the digital signal outputted by the A/D conversion unit 301. As a result, the digital signal is divided into signals of different frequencies.

The de-mapping unit 303 de-maps the signals outputted by the Fourier transform unit 302 to signals compatible with a communication protocol used by the communication apparatus 1.

The decryption unit 304 decrypts an encryption applied to the reception signal. Further, the decryption unit 304 performs error correction using an FEC (Forward Error Correction) code given to the de-mapped signals.

The CRC error detection unit 305 confirms a CRC outputted by the decryption unit 304 and detects whether or not normal communication has been performed. A signal determined to be normal communication is transmitted to the control unit 60 as the reception data.

The transmission unit 20 modulates the transmission data using a predetermined frequency and sends the result to the coaxial cable as a transmission signal. The transmission unit 20 includes a CRC error processing unit 401, an encryption unit 402, a mapping unit 403, a Fourier inverse transform unit 404, and a D/A (Digital to Analog) conversion unit 405.

The CRC error processing unit 401 assigns a CRC code to the transmission data on which the control unit 60 has performed information processing.

The encryption unit 402 encrypts a signal outputted by the CRC error processing unit 401. At this time, the encryption unit 402 also assigns a FEC code.

The mapping unit 403 maps a signal outputted by the encryption unit 402 to a signal transmitted to the coaxial cable. Further, the mapping unit 403 decides on a frequency (frequency band) modulating the transmission data based on the instruction from the signal transmission control unit 50. Further, the mapping unit 403 notifies the Fourier inverse transform unit 404 of the frequency modulating the transmission data.

The Fourier inverse transform unit 404 modulates a signal outputted by the mapping unit 403, converting it into a transmission signal.

The D/A conversion unit 405 converts the transmission signal, which is a digital signal, into an analog signal and sends the converted signal to the coaxial cable.

Next, the operation of the communication apparatus 1 will be described.

Before starting communication using the coaxial cable, the communication apparatus 1 detects whether or not a communication signal used by a wireless communication device (for instance, a mobile telephone) is present in the coaxial cable.

Figure 4:
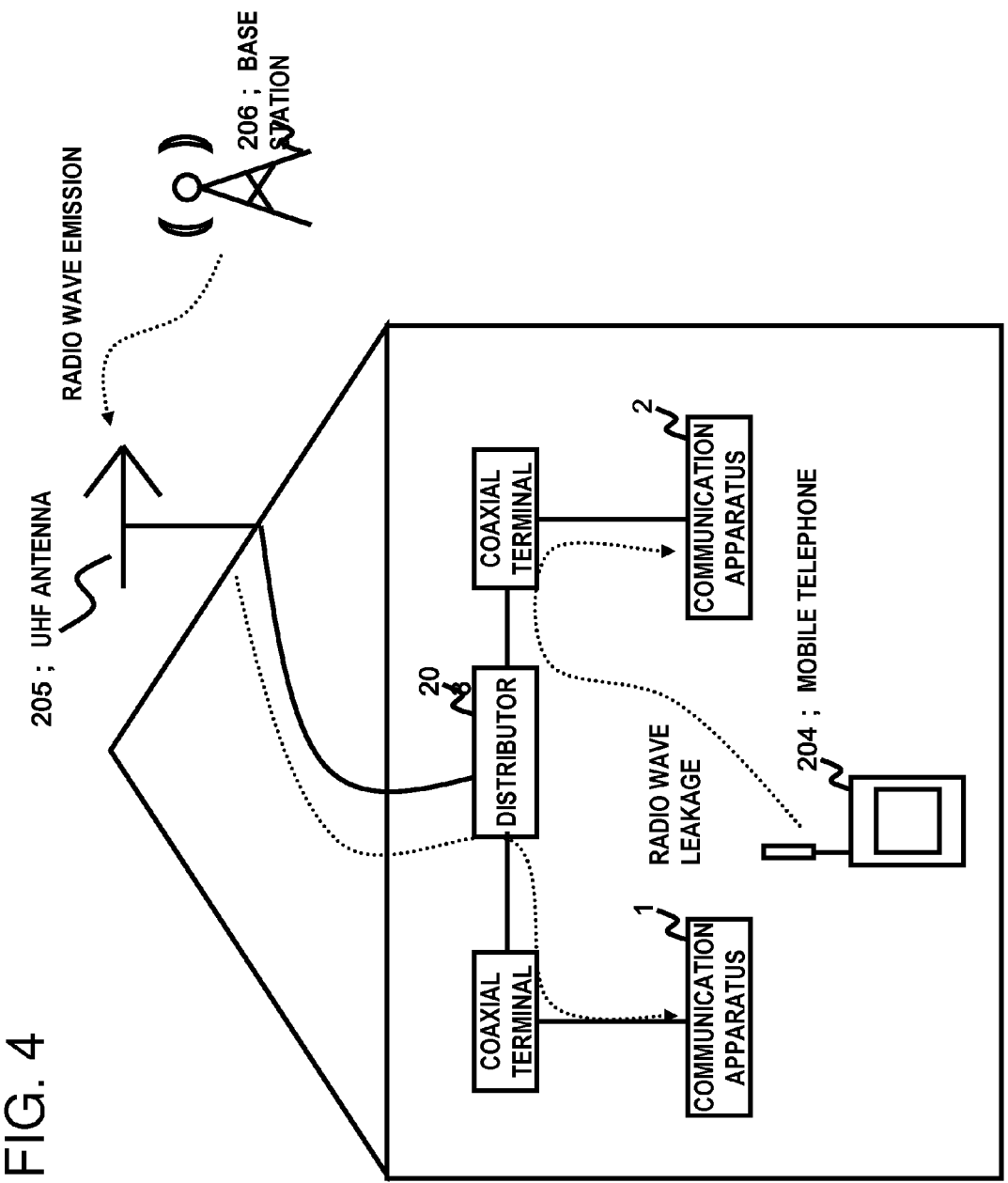
FIG. 4 is a drawing for explaining the operation of the communication apparatus 1.
Figure 8:
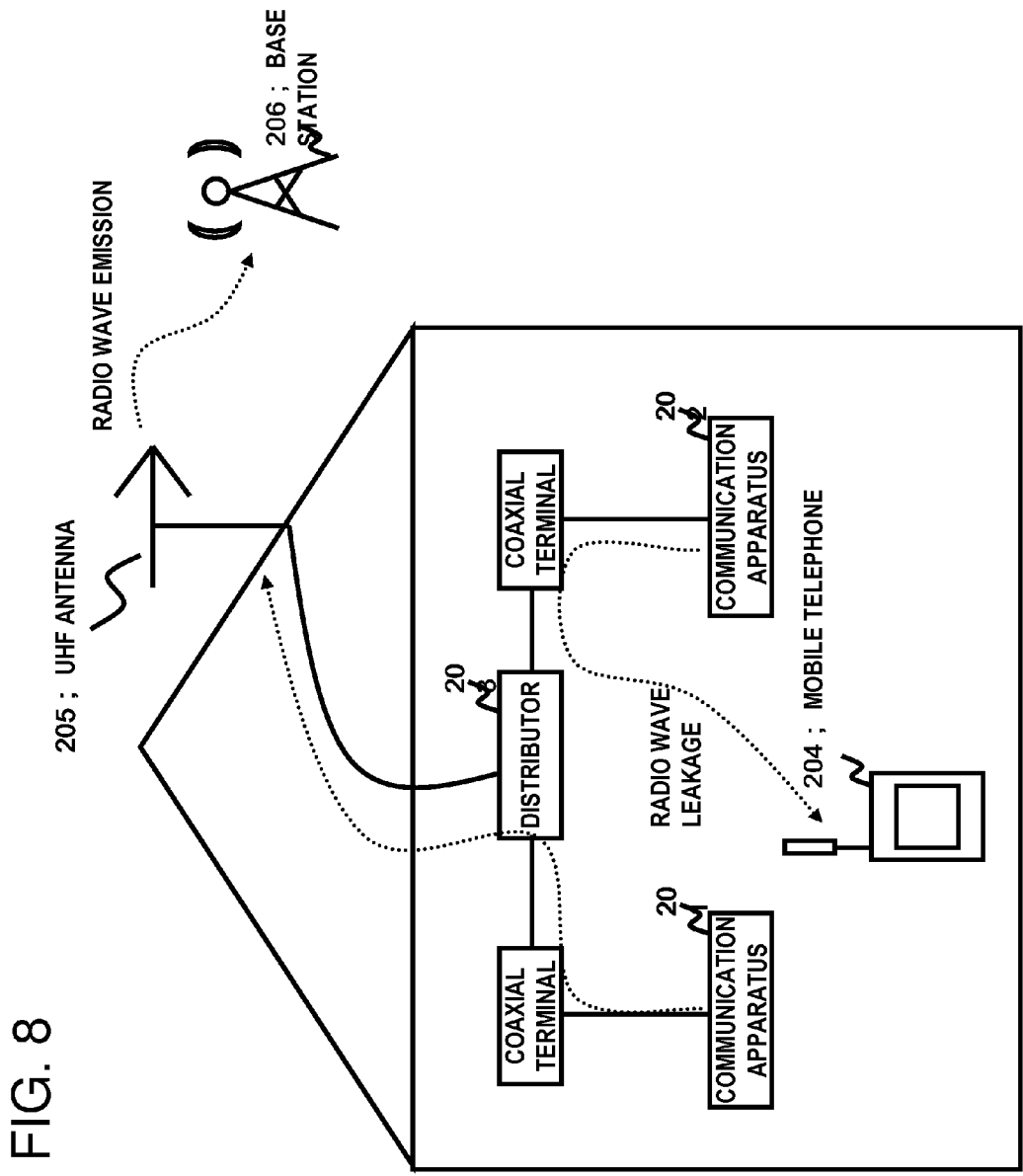
FIG. 8 is a drawing for explaining the effects a communication apparatus has on a wireless communication device.

FIG. 4 is a drawing for explaining the operation of the communication apparatus 1. In FIG. 4, the same signs are given to elements same as those in FIG. 8, and explanation of them will be omitted.

In FIG. 4, the mobile telephone 204 is performing bilateral communication with the base station 206. At this time, signals used in the communication in the uplink direction (from the mobile telephone 204 to the base station 206) and the downlink direction (from the base station 206 to the mobile telephone 204) may get superimposed on the coaxial cable. The communication apparatus 1 detects such a signal (i.e., an interference signal) superimposed on the coaxial cable.

Figure 5:
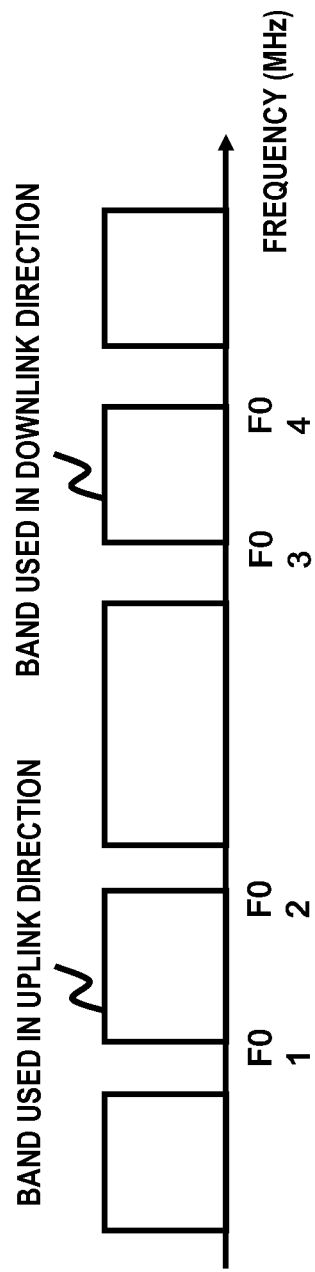
FIG. 5 is a drawing showing an example of frequency bands including the frequency bands used by a mobile telephone 204.

FIG. 5 is a drawing showing an example of frequency bands including the frequency bands used by the mobile telephone 204.

The mobile telephone 204 performs uplink communication by using a bandwidth B01 to B02 MHz in a frequency band F01 to F02 MHz. If the communication apparatus 1 detects a signal of the bandwidth B01 to B02 MHz in the frequency band F01 to F02 MHz on the coaxial cable, it is recognized that a wireless communication device (the mobile telephone 204) using the signal is present in the vicinity of the communication apparatus 1.

Meanwhile, the base station 206 performs downlink communication by using the bandwidth B01 to B02 MHz in a frequency band F03 to F04 MHz. If the communication apparatus 1 detects a signal of this bandwidth in this frequency band on the coaxial cable, it is recognized that the base station 206 using this band is present in the vicinity of the communication apparatus 1.

Further, when grasping the presence of an interference signal in the coaxial cable, the communication apparatus 1 notifies the user of the fact that a wireless communication device or base station is present in the vicinity, using the interference signal notification unit 40. Having received the notification, the user installs filters between the UHF antenna 205 and the distributor 203 and between a coaxial terminal and the communication apparatus 1. Or the interference signal notification unit 40 may output a display or sound that directly prompts the user to install filters. Further, the notification may be about the improvement of the anti-noise performance of the coaxial terminals, instead of the installation of filters.

When detecting these signals (interference signal: a signal in the uplink or the downlink direction), the communication apparatus 1 performs communication while avoiding the frequency band used by these interference signals. More concretely, when an interference signal using the frequency band F01 to F02 MHz is detected, the frequency band F01 to F02 MHz will not be used. Or when an interference signal using the frequency band F03 to F04 MHz is detected, the frequency band F03 to F04 MHz will not be used. In other words, when an interference signal is detected and the frequency band used by the communication apparatus 1 and the frequency band including a frequency used to modulate the interference signal overlap, the communication apparatus 1 modulates the transmission data using a frequency included in a frequency band that does not have the frequency band including the frequency used to modulate the interference signal.

Further, the communication apparatus 1 regularly looks for an interference signal, and if no interference signal is detected, the communication apparatus 1 performs communication using the frequency bands in which the communication apparatus 1 has looked for an interference signal (F01 to F02 MHz and F03 to F04 MHz in FIG. 5). Further, when no interference signal is detected in the coaxial cable due to the fact that the user has inserted a filter or that the performance of the coaxial terminals has been improved, the communication apparatus 1 may determine that an impact on the communication performed by a mobile telephone is low and start communication using the frequency band used by the interference signal.

Figure 6:
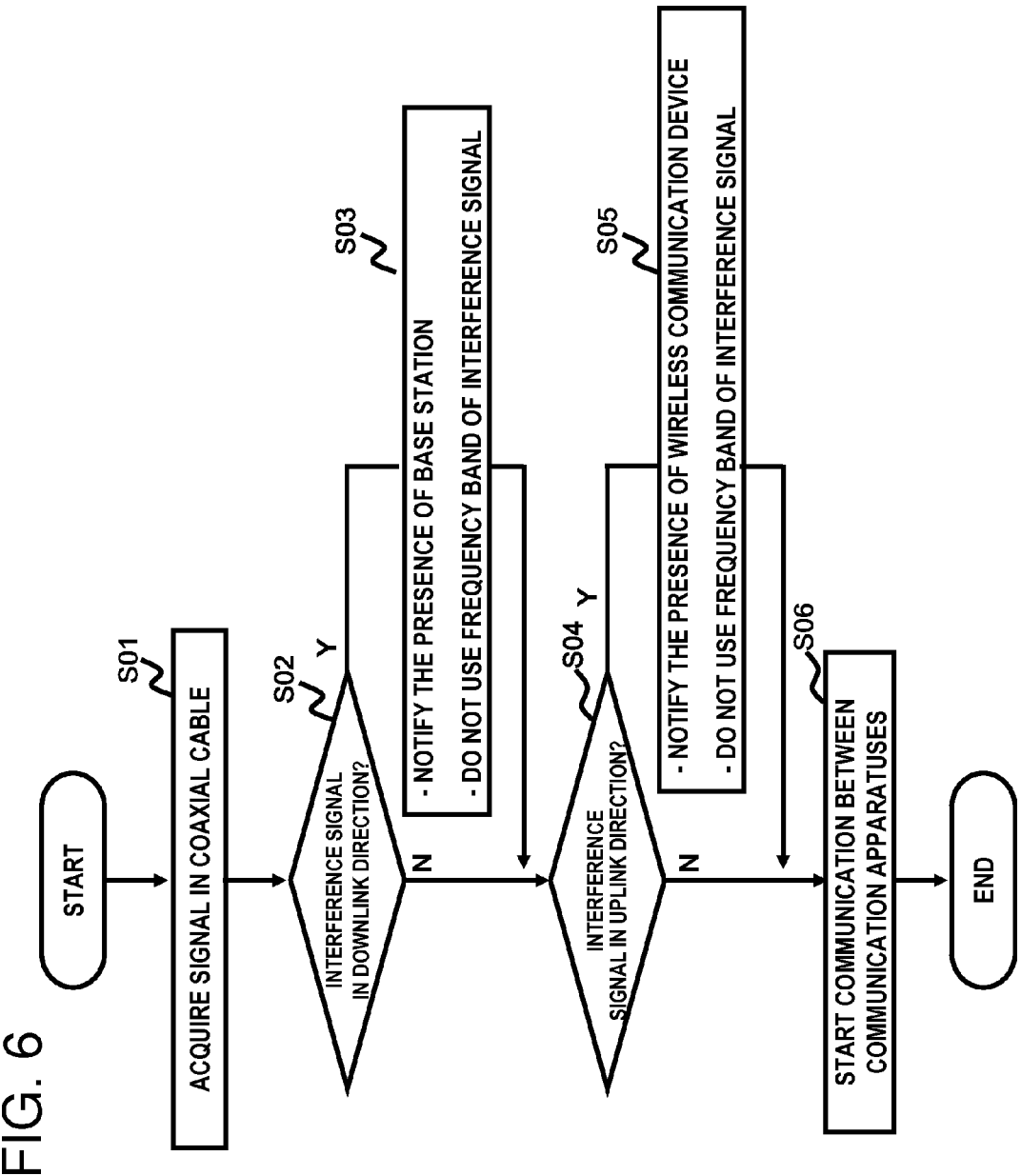
FIG. 6 is a flowchart illustrating an operation example of the communication apparatus 1.

FIG. 6 is a flowchart illustrating an operation example of the communication apparatus 1.

In step S01, before starting to communicate with another communication apparatus (for instance, the communication apparatus 2), the reception unit 10 acquires a signal in the coaxial cable for a predetermined period of time. When an interference signal in the downlink direction (a signal transmitted from the base station 206) is present in the acquired signal (Yes in step S02), the interference signal notification unit 40 notifies the user of the presence of the base station 206 (step S03). Having received the notification, the user installs a filter in an appropriate location. Meanwhile, the signal transmission control unit 50 instructs the transmission unit 20 not to use a frequency band used by the interference signal in the downlink direction (step S03).

Further, the fact that the interference signal in the downlink direction is detected means that a mobile telephone is likely to be present in a house where the communication apparatus 1 is installed. Therefore, the signal transmission control unit 50 instructs the transmission unit 20 not to use a frequency band used by an interference signal in the uplink direction as necessary.

When no interference signal in the downlink direction exists (No in the step S02), the reception unit 10 confirms whether or not any interference signal in the uplink direction is present. When an interference signal in the uplink direction (a signal transmitted from the mobile telephone 204) does exist (Yes in step S04), the interference signal notification unit 40 notifies the user of the presence of the mobile telephone 204 (step S05). Meanwhile, the signal transmission control unit 50 instructs the transmission unit 20 not to use the frequency band used by the interference signal in the uplink direction (step S05). The presence of the mobile telephone 204 in the vicinity of communication apparatus 1 also indicates that the base station 206 is likely to exist in the area. Therefore, the signal transmission control unit 50 instructs the transmission unit 20 not to use the frequency band used by the interference signal in the downlink direction as necessary.

In step S06, the communication apparatus 1 starts to communicate with another communication apparatus. The communication apparatus 1 performs the operation described above when starting communication with another communication apparatus.

Further, when starting communication and detecting an interference signal in the coaxial cable, the communication apparatus may display a screen that prompts the user to use the mobile telephone 204. This is because it is better to determine whether or not an interference signal can be detected in the coaxial cable when the mobile telephone 204 is already known to be used in the same house. At this time, it is preferable that the display screen encourage the user to walk around in each room in the house while holding the mobile telephone 204. This is because it is better to accurately determine the presence of an interference signal caused by the mobile telephone 204.

Next, the operation of the communication apparatus 1 during a communication operation will be described.

Figure 7:
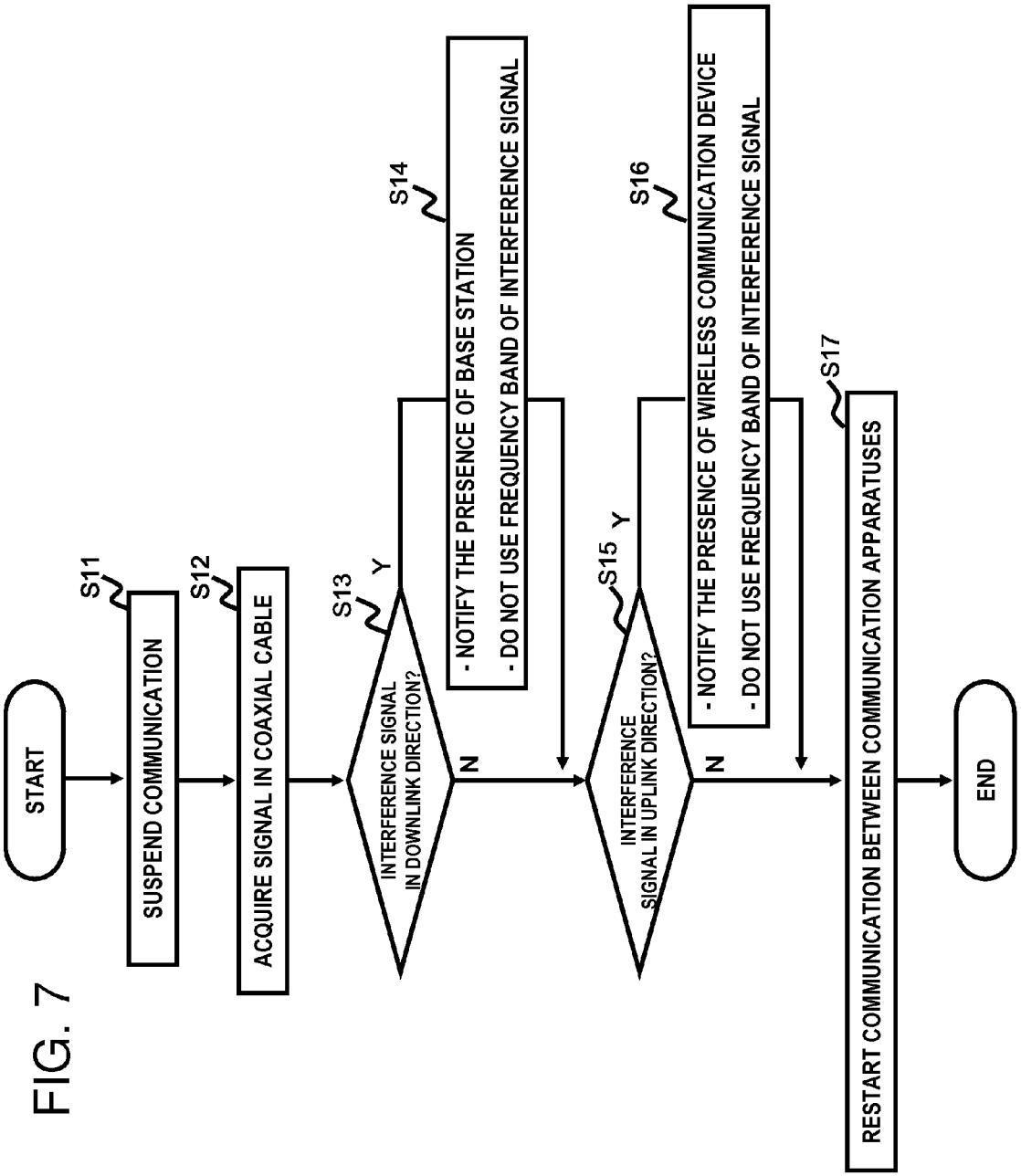
FIG. 7 is a flowchart illustrating an operation example of the communication apparatus 1 during a communication operation.

FIG. 7 is a flowchart illustrating an operation example of the communication apparatus 1 during a communication operation.

The communication apparatus 1 in the communication operation instructs the transmission unit 20 to suspend the communication on a regular basis (step S11) using the control unit 60. Then, the interference signal detection unit 30 detects the presence of an interference signal (steps S12, S13, and S15). When no interference signal is present in the coaxial cable, the control unit 60 instructs the transmission unit 20 to restart the communication (step S17). When an interference signal is present, this fact is notified to the user, and overlapping of used frequency bands is avoided (steps S14 and S16). Further, if the interference signal detection unit 30 does not detect a signal transmitted by the mobile telephone 204 in the uplink direction and a signal transmitted by the base station 206 in the downlink direction due to a filter installed by the user, frequencies in the frequency bands used by these signals can also be utilized.

Since each service provider for wireless communication using mobile telephones and smartphones uses a different frequency band or bandwidth, it is preferable to adjust to the specifications of a signal being detected for each service provider and sequentially confirm whether or not these signals overlap on the coaxial cable (i.e., they get detected as interference signals).

The communication apparatus 1 can be realized as a modem connected to a PC (Personal Computer) and having the PC join a LAN. The communication apparatus 1 can also be realized as a PC with a network card supporting communication using a coaxial cable.

As described, the communication apparatus 1 relating to the present exemplary embodiment detects the presence of an interference signal in a coaxial cable. When an interference signal is present in the coaxial cable, the communication apparatus 1 communicates with another communication apparatus while avoiding the frequency band used by the interference signal.

Further, since communication signals used by a wireless communication device such as a mobile telephone can travel in two different directions (uplink and downlink), these directions are distinguished from each other and the used frequency is suitably switched. In other words, the presence of an interference signal is detected by confirming the frequency, the direction, and the bandwidth used by a communication service provider and comparing the information with a signal acquired from the reception unit 10. On top of that, the communication apparatus 1 achieves control of communication signals in both uplink and downlink directions. As a result, interference accompanying a wireless communication device such as a mobile telephone can be effectively eliminated.

Further, since the communication apparatus 1 detects the presence of an interference signal on a regular basis, even when a mobile telephone that did not initially exist is brought into the house, the communication apparatus 1 grasps the presence of such a wireless communication device and eliminates overlapping of used frequency bands.

The disclosure of the aforementioned Patent Literature is incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

What is claimed is:

1. A communication apparatus, comprising:
   a reception unit that receives a reception signal from a metal cable and extracts reception data;
   a transmission unit that sends a transmission signal obtained by modulating transmission data with a frequency included in a first frequency band to said metal cable;
   an interference signal detection unit that detects a signal used in wireless communication, modulated by a frequency included in a second frequency band, and transmitted over said metal cable as an interference signal; and a signal transmission control unit that instructs said transmission unit to modulate transmission data using a frequency included in a third frequency band that does not have any frequency band overlapping said second frequency band when said interference signal is detected and a frequency band overlapping both said first frequency band and said second frequency band exists.

2. The communication apparatus according to claim 1, further comprising an interference signal notification unit that notifies a user of the presence of said interference signal in said metal cable when said interference signal is detected.

3. The communication apparatus according to claim 2, wherein said signal transmission control unit instructs transmission data to be modulated using a frequency included in a fifth frequency band that does not have any frequency band overlapping a fourth frequency band paired with said second frequency band used for realizing said wireless communication when said interference signal is detected.

4. The communication apparatus according to claim 3, wherein said interference signal notification unit issues a notification that prompts a user to install a filter in said metal cable.

5. The communication apparatus according to claim 2, wherein said interference signal notification unit issues a notification that prompts a user to install a filter in said metal cable.

6. The communication apparatus according to claim 1, further comprising:
a control unit that instructs said transmission unit to suspend the transmission of said transmission signal, wherein
said interference signal detection unit detects said interference signal while the transmission of said transmission signal is suspended, and
said control unit has said transmission unit restart the transmission of said transmission signal when said interference signal is not detected during the suspension of the transmission of said transmission signal.

7. A method for controlling a communication apparatus, comprising:
using a communication apparatus which comprises:
a reception unit that receives a reception signal from a metal cable and extracts reception data; and
a transmission unit that sends a transmission signal obtained by modulating transmission data with a frequency included in a first frequency band to said metal cable,
said method further comprising:
detecting a signal used in wireless communication, modulated by a frequency included in a second frequency band, and transmitted over said metal cable as an interference signal; and
instructing said transmission unit to modulate transmission data using a frequency included in a third frequency band that does not have any frequency band overlapping said second frequency band when said interference signal is detected and a frequency band overlapping both said first frequency band and said second frequency band exists.

8. The method for controlling a communication apparatus according to claim 7, further comprising notifying a user of the presence of said interference signal in said metal cable when said interference signal is detected.

9. The method for controlling a communication apparatus according to claim 8, wherein when notifying a user of the presence of said interference signal, a notification is issued that prompts a user to install a filter in said metal cable.

10. The method for controlling a communication apparatus according to claim 7, instructing transmission data to be modulated using a frequency included in a fifth frequency band that does not have any frequency band overlapping a fourth frequency band paired with said second frequency band used for realizing said wireless communication when said interference signal is detected.

11. The method for controlling a communication apparatus according to claim 10, wherein when notifying a user of the presence of said interference signal, a notification is issued that prompts a user to install a filter in said metal cable.

12. The method for controlling a communication apparatus according to claim 7, further comprising:
instructing said transmission unit to suspend the transmission of said transmission signal; and
having said transmission unit restart the transmission of said transmission signal when said interference signal is not detected during the suspension of the transmission of said transmission signal.

13. A non-transitory computer readable medium containing a program executed by a computer that controls a communication apparatus, wherein said program executes by using a communication apparatus comprising:
a reception unit that receives a reception signal from a metal cable and extracts reception data; and
a transmission unit that sends a transmission signal obtained by modulating transmission data with a frequency included in a first frequency band to said metal cable, said program executing:
detecting a signal used in wireless communication, modulated by a frequency included in a second frequency band, and transmitted over said metal cable as an interference signal; and
instructing said transmission unit to modulate transmission data using a frequency included in a third frequency band that does not have any frequency band overlapping said second frequency band when said interference signal is detected and a frequency band overlapping both said first frequency band and said second frequency band exists.

14. The medium according to claim 13, wherein the program executes notifying a user of the presence of said interference signal in the metal cable when said interference signal is detected.

15. The medium according to claim 14, wherein the program executes instructing transmission data to be modulated using a frequency included in a fifth frequency band that does not have any frequency band overlapping a fourth frequency band paired with said second frequency band used for realizing the wireless communication when said interference signal is detected.

16. The medium according to claim 15, wherein when notifying a user of the presence of said interference signal, the program executes issuing a notification that prompts a user to install a filter in the metal cable.

17. The medium according to claim 14, wherein when notifying a user of the presence of said interference signal, the program executes issuing a notification that prompts a user to install a filter in the metal cable.

18. The medium according to claim 13, wherein the program executes:
instructing said transmission unit to suspend the transmission of said transmission signal; and having said transmission unit restart the transmission of said transmission signal when said interference signal is not detected during the suspension of the transmission of said transmission signal.

* * * * *